(12) United States Patent
Asahina et al.

(10) Patent No.: US 7,012,115 B2
(45) Date of Patent: Mar. 14, 2006

(54) AQUEOUS URETHANE POLYOL AND COATING COMPOSITION CONTAINING THE SAME

(75) Inventors: Yoshiyuki Asahina, Tokyo (JP); Hironori Katagawa, Yokohama (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 62 days.

(21) Appl. No.: 10/629,545

(22) Filed: Jul. 30, 2003

(65) Prior Publication Data

US 2005/0027066 A1 Feb. 3, 2005

(51) Int. Cl.
*C08J 3/00* (2006.01)
*C08K 3/20* (2006.01)
*C08L 75/00* (2006.01)
*C08F 8/30* (2006.01)
*B05D 3/02* (2006.01)

(52) U.S. Cl. ............... 524/591; 427/372.2; 427/385.5; 524/839; 524/840; 525/123; 525/440

(58) Field of Classification Search ............ 427/372.2, 427/385.5; 524/591, 839, 840; 525/123, 525/440
See application file for complete search history.

(56) References Cited

U.S. PATENT DOCUMENTS 5,710,209 A * 1/1998 Blum et al. ............... 524/591

FOREIGN PATENT DOCUMENTS

| GB | 2 073 609 A | 10/1981 |
| GB | 2 200 644 A | 8/1988 |
| JP | 62-151419 A | 7/1987 |
| JP | 63-175079 A | 7/1988 |
| JP | 2-3465 A | 1/1990 |
| WO | WO 96/40813 A1 | 12/1996 |
| WO | WO 98/16583 A1 | 4/1998 |

OTHER PUBLICATIONS

Derwent abstract of JP 63175079 A.
Derwent abstract of JP 62151419 A.
Derwent abstract of JP 2-3465 A.

* cited by examiner

*Primary Examiner*—Patrick D. Niland
(74) *Attorney, Agent, or Firm*—Birch, Stewart, Kolasch & Birch, LLP

(57) ABSTRACT

The present invention provides an aqueous urethane polyol comprising a hydroxyl group, a urethane group and a hydrophilic groups in a molecule, wherein: an average number of hydroxyl group is 3 to 20; a hydroxyl value is 10 to 200 (mg KOH/g); an equivalent ratio of (urethane group)/(hydroxyl group+hydrophilic group) is 1 to 2; and a number average molecular weight is 1,000 to 20,000.

16 Claims, No Drawings

AQUEOUS URETHANE POLYOL AND COATING COMPOSITION CONTAINING THE SAME

BACKGROUND OF THE INVENTION (1) Field of the Invention

The present invention relates to an aqueous urethane polyol having a urethane group, a hydroxyl group and a hydrophilic group altogether in a single molecule.

(2) Description of the Related Art

The aqueous coating is increasingly drawing public attention from the view point of global environment, safety and hygiene in recent years. It has come to be used for exterior coatings for building as well as industrial coatings for industrial products, such as for food cans and for coil coating. Further, there have been many proposals as to the one package automotive coating, which is required to have the high levels of quality, for example, in weatherablity, chemical resistance impact resistance and the like, as disclosed in, for example, GB 2,073,609, JP-A-63-175079 and GB 2,200,644. Most of the hardening agents used in these techniques are an alkyletherified melamine resin alone. A coating film formed by using a melamine resin as a hardening agent has superior properties, such as hardness, but is low in flexibility such as impact resistance.

In this connection, many proposals have been made to impart flexibility by introducing urethane bonds into a coating film. Methods for introducing urethane bonds include, for example, a method wherein an aqueous blocked polyisocyanate is used as a hardening agent and a method wherein a polyurethane dispersion is added.

As a technique to make a blocked polyisocyanate aqueous, for example, a surfactant is used for making a blocked polyisocyanate aqueous in U.S. Pat. No. 4,163,814. In U.S. Pat. No. 4,357,441, it is achieved by a method using a polyethylene oxide containing a higher aliphatic acid with 7 to 26 carbon atoms and blocking the isocyanate groups of a polyisocyanate with sodium bisulfite to obtain an aqueous blocked polyisocyanate.

JP-A-62-151419 and JP-A-2-3465 disclose a technique to make a blocked polyisocyanate with a isocyanurate structure, which is heat resistant, aqueous.

JP-A-62-151419 discloses a technique to impart water dispersibility to a blocked polyisocyanate to which polyoxyethylene groups are added, by further adding a water-soluble polymer compound, such as polyethylene glycol and a copolymer of ethylene oxide and propylene oxide.

In U.S. Pat. No. 4,925,885, hydrophilicity is imparted by using hydroxycarboxylic acid. The above-described blocked polyisocyanates tend to be inferior in low temperature hardening property, as compared with melamine type hardeners.

A technique relating to a polyurethane dispersion having urethane groups and urea groups within a molecule and has a number average molecular weight of above 20,000, is shown, for example, in U.S. Pat. No. 6,172,126. The polyurethane dispersion generally has no functional group and, thus, does not participate in a crosslinked structure. The coating film from a polyurethane dispersion, therefore, tends to have an inferior water resistance and further, a poor hiding power to smooth the unevenness of a substrate to be coated.

On the other hand, urethane polyols having both urethane groups and hydroxyl groups are known. Urethane polyols are utilized as a main component or a modifier therefor and can be utilized in versatile applications by using in combination with a hardening agent, such as a (block) polyisocyanate and a melamine type hardening agent. The examples of these proposals include polyester-polyurethane polyols obtained from an organic polyisocyanate and a polyester polyol in U.S. Pat. No. 4,485,228 and U.S. Pat. No. 4,540,766; urethane polyols obtained from a 2-5 functional polyisocyanate and a diol in U.S. Pat. No. 5,155,201 and U.S. Pat. No. 5,539,303; urethane polyols obtained from a 2-5 functional polyisocyanate and symmetric 1,3-diol in U.S. Pat. No. 5,130,405; urethane polyols with low viscosity in WO 96/40813; and a coating composition comprising a 2-5 functional cyclic polyurethane polyol in WO 98/16583. All of theses are, however, a non-aqueous type having no hydrophilic group and, thus, the development of an aqueous urethane polyol in consideration of the global environment has been awaited.

SUMMARY OF THE INVENTION

An object of the present invention is to provide an aqueous urethane polyol with good weatherability, which can impart flexibility, such as resistance to chipping, and hiding power to smooth the unevenness of a substrate.

The present inventors, after extensive study, solved the above-described problems and thus achieved the present invention. Most of currently formulated coating compositions that are composed mainly of a polyol, a melamine type hardening agent and a polyurethane dispersion have poor hiding power, although they were superior in hardening property for a coating and the flexibility of a coating film. Surprisingly, the use of an aqueous urethane polyol of the present invention instead of the urethane dispersion showed a remarkable improvement in hiding power.

That is, the present invention relates to the following embodiments;

(1) An aqueous urethane polyol, comprising a hydroxyl group, a urethane group and a hydrophilic group in a molecule, wherein:
   an average number of hydroxyl groups is 3 to 20;
   a hydroxyl value is 10 to 200 (mg KOH/g);
   an equivalent ratio of (urethane group)/(hydroxyl group+ hydrophilic group) is 1 to 2; and
   a number average molecular weight is 1,000 to 20,000.

(2) The aqueous urethane polyol in accordance with (1), wherein the average number of hydroxyl groups is 6 to 20.

(3) A method for producing the aqueous urethane polyol in accordance with (1), comprising reacting:
   (a) a polyisocyanate derived from at least an aliphatic and/or an alicyclic diisocyanate, having:
      an average number of isocyanate groups of 3 to 20;
      a concentration of isocyanate group of 3 to 25% by weight;
      a concentration of diisocyanate monomer of 3% by weight or less; and
      a number average molecular weight of 600 to 19,000;
   (b) a polyol; and
   (c) a compound comprising an active hydrogen group and a hydrophilic group in a single molecule;
      at an equivalent ratio of (hydroxyl group of (b)+active hydrogen group of (c))/(isocyanate group of (a))>1.

(4) The production method in accordance with (3), wherein the number average molecular weight of polyisoyanate is 900 to 19,000.

(5) The production method in accordance with (3), wherein the average number of isocyanate groups of the polyisocyanate is 6 to 20.

(6) The production method in accordance with any one of (3) to (5), wherein the polyisocyanate is derived from an aliphatic and/or an alicyclic diisocyanate and polyol.

(7) An aqueous coating composition, comprising the aqueous urethane polyol in accordance with (1) or (2).

(8) The aqueous coating composition in accordance with (7), which is for an aqueous coating as primer for automobiles.

(9) A method for using the aqueous urethane polyol in accordance with (1) or (2) as an aqueous coating as primer for automobiles.

PREFERRED EMBODIMENT OF THE INVENTION

The present invention will be described in detail hereinbelow.

The urethane polyol of the present invention has urethane groups, hydroxyl groups and hydrophilic groups altogether in a single molecule but does not have a urea group. The presence of a urea group lowers compatibility with a polyol and hiding power.

The aqueous urethane polyol of the present invention has the average number of hydroxyl groups (the statistical average number of hydroxyl groups in a molecule) of 3 to 20. If the average number of hydroxyl groups is less than 3, crosslinking property is poor to lower the hardening property and the physical properties of a coating film. If, the average number is more than 20, crosslink density becomes too high, which may lead to the inferior physical properties, such as flexibility of a coating film. Therefore, the average number is preferably 6 to 20. The average number within this range can give a coating film superior in hardening property, flexibility and toughness.

The hydroxyl value of the aqueous urethane polyol of the present invention is 10 to 200 mg KOH/g. If the hydroxyl value is less than 10 mg KOH/g, crosslinking property becomes low to lower hardening property and the physical properties of a coating film. If, the value is above 200 mg KOH/g, crosslink density becomes too high, which may lead to the inferior physical properties such as flexibility of a coating film. Therefore, the hydroxyl value is preferably 10 to 100 mg KOH/g and more preferably 10 to 50 mg KOH/g. The hydroxyl value within the range can give a coating film superior in water resistance, as well as good dispersibility and solubility in a medium containing water.

The ratio of (urethane group)/(hydroxyl group+hydrophilic group) of an urethane polyol of the present invention is 1 to 2 (equivalent ratio). If the ratio is above 2, cohesive force becomes too high, which may lead to inferior compatibility with a polyol. If the ratio is less than 1, cohesive force is decreased, which may lower the toughness of a coating film. Therefore, the ratio is preferably 1 to 1.5. The ratio within this range can give a coating film with good flexibility and toughness.

The number average molecular weight of the urethane polyol of the present invention is 1,000 to 20,000. If the number average molecular weight is less than 1,000, crosslink density becomes too high. If the number average molecular weight is more than 20,000 compatibility with a polyol as a coating component may decrease. Therefore, it is preferably 1,500 to 15,000. The number average molecular weight within this range can give a coating film with good flexibility and toughness.

Methods for producing the aqueous urethane polyol of the present invention will be described in detail hereinbelow. The urethane polyol of the present invention can be obtained by reacting:
(a) a polyisocyanate derived from at least aliphatic and/or alicyclic diisocyanate, satisfying the following conditions:
   1) an average number of isocyanate groups: 3 to 20;
   2) a concentration of isocyanate group: 3 to 25% by weight;
   3) a concentration of a diisocyanate monomer: 3% by weight or less; and
   4) a number average molecular weight: 600 to 19,000;
(b) a polyol; and
(c) a compound having an active hydrogen group and a hydrophilic group in a single molecule;

in an equivalent ratio of (hydroxyl group of (b)+active hydrogen group of (c))/(isocyanate group of (a))>1.

The aliphatic diisocyanate monomer composing the polyisocyanate (a) is preferably a diisocyanate monomer with 4 to 30 carbon atoms. The alicyclic diisocyanate monomer composing the polyisocyanate (a) is preferably a diisocyanate monomer with 8 to 30 carbon atoms. The examples thereof include, for example, tetramethylene-1,4-diisocyanate, pentamethylene-1,5-diisocyanate, hexamethylenediisocyanate, 2,2,4-trimethyl-hexamethylene-1,6-diisocyanate, lysinediisocyanate, isophoronediisocyanate, 1,3-bis(isocyanatomethyl)cyclohexane and 4,4'-dicyclohexylmethanediisocyanate. Among others, hexamethylenediisocyanate (hereinafter referred to as HDI) and isophoronediisocyanate (hereinafter referred to as IPDI), are preferable from the viewpoint of weatherability and industrial availability, and HDI is more preferable. They may be used alone or in combination.

The above-described diisocyanate monomers are converted to polyisocyanates by various oligomerization methods to increase their molecular weight. The thus obtained polyisocyanates have one or more of, for example, biuret bond, isocyanurate bond, urethodione bond, urethane bond, allophanate bond and oxadiazinetrione bond, etc.

In addition to the above-described diisocyanate monomers, a polyol can be used as a raw material of the polyisocyanate used in the present invention. Such polyols include those with low molecular weight and high molecular weight. The low molecular weight polyols include diols, triols and tetraols. Diols include, for example, ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl- 2,3-butanediol, 2-ethyl-hexanediol, 1,2-octanediol, 1,2-decanediol, 2,2,4-trimethylpentandiol, 2-butyl-2-ethyl-1,3-propanediol and 2,2-diethyl-1,3-propanediol; triols include, for example, glycerine and trimethylolpropane; and tetraols include, for example, diglycerine, dimethylolpropane and pentaerythritol. The high molecular weight polyols include polyester, polyether and acryl types.

Polyester polyols include, for example, polyester polyols obtained by condensation reaction between a single dibasic acid or a mixture of dibasic acids selected from a group consisting of carboxylic acids, such as succinic acid, adipic acid, sebacic acid, dimer acid, maleic anhydride, phthalic anhydride, isophthalic acid and terephthalic acid, and a single polyol or a mixture of polyols selected from the above-described group of the low molecular weight polyols; and polycaprolactones obtained, for example, by the ring opening polymerization of ε-caprolactone to the hydroxyl groups of a low molecular weight polyol. These polyester polyols can be modified with aromatic diisocyanate, aliphatic and alicyclic diisocyanates and polyisocyanates obtained from them. In this case, in particular, aliphatic and alicyclic diisocyanates and polyisocyanates obtained from them are preferable from the viewpoint of weatherability and resistance to yellowing. Among these polyesters, the polycaprolactone polyol is preferable and the polycaprolactone polyol with the number average molecular weight of 250 to 1,000 and the number of hydroxyl groups of 3 to 6 is more preferable, in order to attain the preferable average number of isocyanate groups as described below. In particular, polyisocyanates with an isocyanurate structure, obtained by an isocyanuration reaction after or simultaneously with a reaction of this polyol and a diisocyanate monomer; and polyisocyanates with an allophanate structure, obtained by an allophanating reaction after or simultaneously with a reaction of this polyol with a diisocyanate monomer are preferable. One example of the above-described polyisocyanate is disclosed in JP-A-6-312969, in which the aqueous urethane polyol of the present invention is neither described nor suggested.

Polyether polyols include polyether polyols obtained by a random or block addition reaction of an alkylene oxide, such as ethylene oxide, propylene oxide, butylene oxide, cyclohexene oxide, styrene oxide and tetrahydrofuran alone or as a mixture thereof, to a polyhydroxy compound, using a strong basic catalyst, such as hydroxide of lithium, sodium or potassium, alcholate and alkylamine, a metal porphyrin or a composite cyano-metal compound complex, such as zinc hexacyanocobaltate complex; polyether polyols obtained by reacting a polyamine compound such as ethylenediamine with an alkylene oxide; and so-called polymer polyols obtained by polymerizing acrylamide using these polyethers as a meduium.

The low molecular weight polyols include, in addition to the above examples;
(1) dipentaerythritol and the like;
(2) sugar-alcohol compounds, such as erythritol, D-threitol, L-arabinitol, ribitol, xylitol, sorbitol, mannitol, galactitol and rhamnitol;
(3) monosaccharides, such as arabinose, ribose, xylose, glucose, mannose, galactose, fructose, sorbose, rhamnose, fucose and ribodesose;
(4) disaccharides, such as trehalose, sucrose, maltose, cellobiose, gentiobiose, lactose and melibiose;
(5) trisaccharides, such as raffinose, gentianose and melezitose; and
(6) tetrasaccharides such as stachyose.

More preferably the polyol has a number average molecular weight of 250 to 1,000 and the number of hydroxyl groups of 3 to 6, to attain the preferable average number of isocyanate groups as described below. In particular, polyisocyanates with an isocyanurate structure, obtained by an isocyanurating reaction after or simultaneously with a reaction of this polyol with a diisocyanate monomer; and polyisocyanate with an allophanate structure, obtained by an allophanating reaction after or simultaneously with a reaction of this polyol with a diisocyanate monomer, are preferable.

Acryl type polyols include, for example, acryl polyols obtained by polymerizing a single compound or a mixture of compounds selected from a group consisting of acrylic acid esters having an active hydrogen, such as 2-hydroxyethyl acrylate, 2-hydroxypropyl acrylate and 2-hydroxybutyl acrylate, or acrylic acid monoester or methacrylic acid monoester of glycerol and acrylic acid monoester or methacrylic acid monoester of trimethylolpropane, and a single compound or a mixture of compounds selected from a group consisting of acrylic acid esters such as methyl acrylate, ethyl acrylate, isopropyl acrylate, n-butyl acrylate and 2-ethylhexyl acrylate; methacrylic acid esters with an active hydrogen such as 2-hydroxyethyl methacrylate, 2-hydroxypropyl methacrylate and 2-hydroxybutyl methacrylate, 3-hydroxypropyl methacrylate and 4-hydroxybutyl methacrylate; or methacrylic acid esters such as methyl methacrylate, ethyl methacrylate, isopropyl methacrylate, n-butyl methacrylate, isobutyl methacrylate, n-hexyl methacrylate and lauryl methacrylate, in the presence or absence of unsaturated carboxylic acid such as acrylic acid, methacrylic acid, maleic acid and itaconic acid; unsaturated amide such as acrylamide, N-methylolacrylamide and diacetoneacrylamide; and other polymerizable monomer such as glicidyl methacrylate, styrene, vinyltoluene, vinyl acetate, acrylonitrile and dibutyl fumarate.

An example of the polyisocyanate in the present invention can be obtained by reacting the above-described diisocyanate and polyol. In the reaction between said diisocyanate and polyol, an equivalent ratio of (isocyanate group of diisocyanate)/(hydroxyl group of polyol) is 5/1 to 50/1, and preferably 5/1 to 20/1. If the ratio is less than 5/1, the viscosity of a resulting polyisocyanate composition becomes high. If the ratio is more than 50/1, productivity is significantly lowered. A reaction temperature is 50 to 200° C., and preferably 50 to 150° C. At a temperature below 50° C., the reaction is difficult to proceed, whereas at a temperature above 200° C. it is accompanied by a undesirable side reaction, such as the coloring of a product. In the reaction, organometallic salts of, for example, tin, zinc, lead, sodium and potassium or tertiary or quaternary amine compounds, alcoholates of alkali metal, such as sodium, and aminosilyl compounds can be used as a catalyst.

When a catalyst is used in the reaction, said catalyst is preferably deactivated with a deactivator such as phosphoric acid, phosphate ester and alcohol, depending on a type of the catalyst.

Unreacted diisocyanate monomer is then removed by using a thin film distillator or extraction.

The statistical average number of isocyanate groups present in a single molecule of polyisocyanate obtained (herein, referred to as "average number of isocyanate groups") is 3 to 20. If it is 3 or less, the hardening property of an aqueous urethane polyol obtained therefrom, becomes inferior. If it is more than 20, the mechanical properties of a coating film formed therefrom may become inferior. Therefore, it is preferably 6 to 12. The average number within the range can provide an aqueous urethane polyol with good dispersibility and solubility to water and a coating film with superior flexibility and toughness.

The concentration of isocyanate group is 3 to 25% by weight. If it is less than 3% by weight, the number of hydroxyl groups of a urethane polyol obtained therefrom is reduced, which is not preferred. If it is more than 25% by weight, the number of hydroxyl groups of a urethane polyol obtained therefrom is also reduced, which is not preferred. Therefore, the concentration is preferably 10 to 20% by weight. The concentration within the range can provide a coating film with good flexibility and toughness.

The concentration of unreacted diisocyanate monomer is 3% by weight or less, preferably 1% by weight or less and more preferably 0.5% by weight or less. If the concentration is more than 3% by weight the number of hydroxyl groups of a urethane polyol obtained therefrom is lowered so that the physical properties of a coating film formed therefrom may be inferior.

The number average molecular weight of the polyisocyanate is 600 to 19,000. If the number average molecular weight is less than 600, the production of an aqueous urethane polyol of the present invention becomes difficult. If it is more than 19,000, compatibility with a resin used in combination may be inferior. Therefore, the number average molecular weight is preferably 900 to 19,000, and more preferably 1,000 to 5,000. When it is within this range, a coating film with superior flexibility and toughness can be formed.

Polyol (b) which can be used in the present invention is a compound with two or more hydroxyl groups, and includes diols and triols. Diols include, for example, ethylene glycol, diethylene glycol, triethylene glycol, propylene glycol, dipropylene glycol, tripropylene glycol, 1,2-propanediol, 1,3-propanediol, 1,2-butanediol, 1,3-butanediol, 1,4-butanediol, 2,3-butanediol, 2-methyl-1,2-propanediol, 1,5-pentanediol, 2-methyl-2,3-butanediol, 1,6-hexanediol, 1,2-hexanediol, 2,5-hexanediol, 2-methyl-2,4-pentanediol, 2,3-dimethyl-2,3-butanediol, 2-ethylhexanediol, 1,2-octanediol, 1,2-decanediol, 2,2,4-trimethylpentandiol, 2-butyl-2-ethyl-1,3-propanediol and 2,2-diethyl-1,3-propanediol. Triols include glycerol and trimethylolpropane. These may be used in combination of two or more types.

Preferable polyol is diol, and a diol having both a primary hydroxyl group and a secondary hydroxyl group is particularly preferable as it can suppress the increase of molecular weight in a reaction between the polyol and the polyisocyanate.

A hydrophilic group is added to the aqueous urethane polyol of the present invention. Methods for introducing a hydrophilic group include, for example, a method to react the polyisocyanate with a compound having both an active hydrogen group and a hydrophilic group within a single molecule. An isocyanate group of the polyisocyanate reacts with the above-described active hydrogen group.

The compound (c) having both an active hydrogen group and a hydrophilic group in the same molecule used in the present invention will be described in detail.

The hydrophilic group in the above-described (c) includes, for example, an anionic group such as carboxyl group, sulfonic acid group and phosphoric acid group; a cationic group such as amino group; and a nonionic group such as polyethylene oxide. These form a hydrophilic group in the aqueous urethane polyol of the present invention. The active hydrogen group includes, for example, hydroxyl group, mercapto group and carboxyl group. The compound having both a hydrophilic group and an active hydrogen group in a single molecule used in the present invention includes, for example, a compound with an ionic group including oxyacid containing a carboxyl group such as glycolic acid, lactic acid, tartaric acid, citric acid, hydroxybutyric acid, hydroxyvaleric acid, hydroxypivalic acid, dimethylolacetic acid, dimethylolpropionic acid and dimethylolbutanoic acid; oxyacid containing a sulfonic acid group such as isethionic acid; and mercaptocarboxylic acid such as mercaptoacetic acid.

An example of a compound with a nonionic group is polyethylene oxide. Polyethylene oxide can be obtained, for example, by adding ethylene oxide to a monohydric alcohol such as methanol, ethanol and butanol, and may contain propylene oxide. The content of ethylene oxide is preferably 50% by weight or more and the number average molecular weight is preferably 200 to 2,000.

These hydrophilic groups may be used in combination thereof. The hydrophilic group is preferably an anionic group, and a nonionic group may optionally be used in combination. Since most of polyols have anionic groups, a cationic group is not preferable as a hydrophilic group for such polyols. Cationic groups cause the coagulation of polyols having anionic groups.

Although the reaction of polyisocyanate (a), polyol (b) and a compound (c) having both a hydrophilic group and an active hydrogen group in the same molecule can be conducted simultaneously, preferably, polyisocyanate (a) is first reacted with the above-described compound (c) having both a hydrophilic group and an active hydrogen group, then the product is reacted with polyol (b).

In the preparation of an acіueous urethane polyol of the present invention, equivalent ratio of (hydroxyl group of (b)+active hydrogen group of (c))/(isocyanate group of (c)) is above 1. If the ratio is less than 1, a resulting compound comes to have too high viscosity or make it difficult to obtain a hydroxyl group as a functional group.

The addition ratio of hydrophilic groups to the total isocyanate groups of the polyisocyanate is 1 to 50% by equivalent and preferably 4 to 40% by equivalent. If it is over 50% by equivalent, the water resistance of a resulting coating film may become inferior.

In the reaction between said polyisocyanate and polyol, the equivalent ratio of (isocyanate group)/(hydroxyl group), present before the reaction, is less than 1, preferably 1/20 to 1/2 and more preferably 1/10 to 1/2. If the ratio is more than 1/2, the increase of molecular weight is promoted to give high viscosity and, thus, less processability. If the ratio is below 1/20, the concentration of unreacted polyol becomes high, which may affect the physical properties of a coating film.

Optionally, a monohydric alcohol may be added to the above-described polyisocyanate. The monohydric alcohol used here includes, for example, ethanol, n-propanol, i-propanol, n-butanol, i-butanol, cyclohexanol and 2-ethylhexanol.

The above-described reaction may be performed in the presence of a solvent. In this case, a solvent that is inert to the isocyanate group should be used. It includes, for example, ketones such as acetone, methyl ethyl ketone and methyl isobutyl ketone; esters such as ethyl acetate, n-butyl acetate and cellosolve acetate; and aromatic solvents such as xylene and toluene. These solvents may be used alone or in combination of two or more kinds. The reaction temperature is 40 to 150° C. and preferably 60 to 120° C. If necessary, a basic compound including a tin compound such as dibutyl tin dilaurate may be used as a catalyst.

The solvent used can be removed, if necessary. It was surprising that even when a solvent has been removed to give the resin concentration of aqueous urethane polyol in water medium of 55 to 95% by weight, this solution still kept fluidity and allowed easy handling in the preparation of a coating. A urethane dispersion which is a representative of the conventional urethane materials has a resin concentration of less than 50% by weight, and the manufacturing of a high solid content coating therefrom was thus sometimes difficult.

The aqueous urethane polyol obtained is adjusted have an appropriate pH by using various amines. Amine used here includes, for example, ammonia, methylamine, ethylamine, propylamine, isopropylamine, butylamine, 2-ethylhexylamine, cyclohexylamine, dimethylamine, diethylamine, dipropylamine, diisopropylamine, dibutylamine, trimethylamine, triethylamine, triisopropylamine, tributylamine, ethylenediamine, morpholine, N-alkyl morpholine, pyridine, monoisopropanolamine, methylethanolamine, methylisopropanolamine, dimethylethanolamine, diethylethanolamine, diisopropanolamine, dimethylethanolamine, diisopropanolamine, diethanolamine, triethanolamine, diethylethanolamine and triethanolamine.

The aqueous urethane polyol of the present invention is defined as a urethane polyol which is dispersible or soluble in a medium containing water. It can be made dispersible or soluble by adjusting pH and the like.

Further, for certain purposes, such as the improvement of dispersibilty in water, a surfactant such as nonionic, anionic, cationic or amphoteric surfactant can be added. The specific surfactant described above includes, for example, nonionic type such as polyethylene glycol and polyol fatty acid esters; anionic type such as fatty acid salts, alkyl sulfate esters, alkylbenzenesulfonate salts, sulfosuccinate salts and alkyl phosphate salts; cationic type such as alkylamine salts and alkylbetains; and amphiphilic type such as carboxylic acid amine salts, sulfonic acid amine salts and sulfate esters.

The aqueous coating composition of the present invention contains, in addition to an aqueous urethane polyol of the present invention, a hardening agent having a functional group to react with the hydroxyl groups of the polyol. The hardening agent includes, for example, a two-part type of polyisocyanate hardening agent capable of hardening at normal temperatures and a one package type of thermohardening agent such as a blocked polyisocyanate type hardening agent and a melamine type hardening agent.

The above-described polyisocyanate type hardening agent is an oligomer consisting of 2 to 20 diisicyanate units having 2 to 20 isocyanate groups in a single molecule and manufactured by forming bonds such as biuret bonds, isocyanurate bonds, uretdione bonds, urethane bonds, allophanate bonds and oxadiazinetrione bonds.

The polyisocyanate with biuret bonds can be obtained by reacting a diisocyanate monomer with a so-called biuret agent such as water, t-butanol and urea, at a molar ratio of (biuret agent)/(isocyanate group of diisocyanate) of about 1/2 to about 1/100, followed by removing unreacted diisocyanate and purifying. Typical examples thereof are disclosed in U.S. Pat. No. 4,176,132, JP-A-55-11452 and JP-A-59-95259.

A polyisocyanate composition with isocyanurate bonds can be obtained by conducting cyclic trimerization using a catalyst or the like, and terminating the reaction when the conversion rate reaches about 5 to about 80% by weight, followed by removing unreacted diisocyanate monomer and purifying. In this case, a 1-6 hydric alcohol compound may be used in combination. Typical examples thereof are disclosed in U.S. Pat. No. 4,324,879, U.S. Pat. No. 4,419,513, JP-A-57-47321, U.S. Pat. No. 4,582,888, JP-A-64-33115, U.S. Pat. No. 5,086,175 and JP-A-6-312969.

A polyisocyanate composition with urethane bonds can be obtained, for example, by reacting a 2-6 hydric polyol such as trimethylolpropane with diisocyanate at an equivalent ratio of (hydroxyl group of polyol)/(isocyanate group of diisocyanate) of about 1/2 to about 1/100, followed by removing unreacted diisocyanate monomer and purifying.

For example, the polyisocyanates disclosed in U.S. Pat. No. 4,711,918 and U.S. Pat. No. 5,252,696, which are made by adding polyethylene glycol having alkoxy at one terminal to these polyisocyanate type hardening agents, can be also used.

The blocked polyisocyanate type hardening agent is a compound obtained by blocking an isocyanate group of the polyisocyanate with a blocking agent.

The blocking agent includes various types of compounds such as alcohol, alkylphenol, phenol, active methylene, mercaptan, acid amide, acid imide, imidazole, urea, oxime, amine, imide and pyrazole types. More specific examples of the blocking agent are shown below.

(1) Alcohols such as methanol, ethanol, 2-propanol, n-butanol, sec-butanol, 2-ethyl-1-hexanol, 2-methoxyethanol, 2-ethoxyethanol and 2-butoxyethanol;
(2) Alkylphenols such as mono- and dialkylphenols having an alkyl substituent with 4 or more carbon atoms including: monoalkylphenols such as n-propylphenol, i-propylphenol, n-butylphenol, sec-butylphenol, tert-butylphenol, n-hexylphenol, 2-ethylhexylphenol, n-octylphenol and n-nonylphenol; and dialkylphenols such as di-n-propylphenol, diisopropylphenol, isopropylcresol, di-n-butylphenol, di-t-butylphenol, di-sec-butylphenol, di-n-octylphenol, di-2-ethylhexylphenol and di-n-nonylphenol;
(3) Phenols such as phenol, cresol, ethylphenol, styrenated phenol and hydroxybenzoate ester;
(4) Active methylenes such as dimethyl malonate, diethyl malonate, methyl acetoacetate, ethyl acetoacetate and acetylacetone;
(5) Mercaptans such as butylmercaptan and dodecylmercaptan;
(6) Acid amides such as acetanilide, acetamide, ε-caprolactam, δ-valerolactam and γ-butylolactam;
(7) Acid imides such as succinimide and maleimide;
(8) Imidazoles such as imidazole and 2-methylimidazole;
(9) Ureas such as urea, thiourea and ethyleneurea;
(10) Oximes such as formaldoxime, acetoaldoxime, acetoxime, methylethylketoxime and cyclohexanone-oxime;
(11) Amines such as diphenylamine, aniline, carbazole, di-n-propylamine, diisopropylamine and isopropylethylamine;
(12) Imines such as ethyleneimine and polyethyleneimine; and
(13) Pirazoles such as pirazole, 3-methyl pirazole and 3,5-dimethylpirazole.

A preferable blocking agent is at least one selected from a group consisting of alcohol, oxime, acid amide, active methylene and pyrazole types.

Blocking reaction between the polyisocyanate and the blocking agent can be performed irrespective of the presence of a solvent. When a solvent is used, a solvent inactive to the isocyanate group should be used.

In the blocking reaction, organometallic salts of, for example, tin, zinc and lead and tertiary amine compounds, alcoholate of alkali metal such as sodium may be used as a catalyst.

Reaction temperature can be generally −20 to 150° C. and preferably 30 to 100° C. At a temperature above 150° C., side reactions may occur, whereas at a temperature below −20° C. the reaction rate becomes low, which is disadvantageous.

The melamine type hardening agent used in the present invention can be obtained, for example, by adding an alkylether group to melamine. Said addition method includes a method comprising reacting melamine and formaldehyde in an alkaline condition to form methylol, followed by reacting the product with alcohol in an acidic condition to obtain an alkylether; and a method to comprising reacting melamine, formaldehyde and alcohol in an acidic condition to obtain an alkylether. Melamine generally has 6 active hydrogens in a molecule, and when these active hydrogens are converted to methylol groups, degree of methylol conversion is determined by a molar ratio of melamine and formaldehyde, pH of the reaction mixture and the like. The alcohols used to obtain an alkylether include, for example, monohydric alcohols such as methanol, ethanol, n-propanol, isopropanol, n-butanol and isobutanol, and may be used in combination of two or more types thereof.

The melamine type hardening agent thus obtained include, for example, fully alkylated-etherified melamine with a methoxy group or a butoxy group; methylol type methylated or butylated melamine; and imino type methylated or butylated melamine.

The mixing ratio of the above-described urethane polyol and the hardening agent depends on desired performances of a coating film. In the case of (block) polyisocyanate, an equivalent ratio of (hydroxyl group)/(isocyanate group) is 5/1 to 1/5, preferably 3/1 to 1/3 and more preferably 2/1 to 1/2. Blocked polyisocyanate and melamine type hardening agent may be used in combination.

When a melamine type hardening agent is used, mixing ratio of an aqueous urethane polyol of the present invention and a melamine type hardening agent is preferably 5:5 to 9:1 and more preferably 6:4 to 8:2.

Various polyols can optionally be used in at the same time. These polyols include, for example, polyether polyols, polyester polyols, acrylic polyols, aliphatic hydrocarbon polyols, epoxy polyols, fluorinated polyols and chlorinated polyols.

Polyester polyols, polyether polyols and acrylic polyols include the polyols described hereinabove.

Aliphatic hydrocarbon polyols include, for example, terminally hydroxylated polybutadiene and hydrogenated compounds thereof.

Epoxy polyols include, for example, bisphenol A, bisphenol F, bisphenol AD, phenol novolak, cresol novolak, alicyclic epoxy, glycidyl ester, glycidylamine and heterocyclic types. A hydroxyl group may be added by reacting a glycidyl group with an amine. The amine in this case includes primary amines such as n-propylamine and isobutylamine; secondary amines such as dimethylamine and diethylamine; tertiary amines such as trimethylamine and triethylamine; and aminoalcohols such as 2-aminoethanol and 2,2'-iminodiethanol.

Fluorinated polyol is a polyol containing a fluorine atom in a molecule, and includes a copolymer of monomers such as fluoro-olefin, cyclovinyl ether, hydroxyalkylvinyl ether and vinyl monocarboxylate ester, disclosed in, for example, U.S. Pat. No. 4,345,057 and U.S. Pat. No. 4,690,968.

Chlorinated polyols are polyols containing a chlorine atom and a hydroxyl group in a molecule, and can be obtained by blowing chlorine gas into polypropylene, polybutene, polypentene, polyethylene or the like in the presence of a catalyst or under the irradiation of ultraviolet light.

Preferable polyols to be used at the same time is an acrylic polyol and a polyester polyol with an acid value of 10 to 50 and a hydroxyl value of 20 to 150. Polyester polyols are particularly preferable as an aqueous intermediate coating for automotive, and an acrylic polyol is optionally used in combination. When these polyols are used in combination, mixing ratio of the polyol to be used in combination to an aqueous urethane polyol of the present invention can be selected from a range of 0.5:9.5 to 9.5:0.5 (ratio by weight).

Further, mixing ratio of the above-described mixed polyols to hardening agent is the above-described ratio of (hydroxyl group)/(isocyanate group) (by equivalent) when the hardening agent is a (block) polyisocyanate type, whereas, the above-described mixing ratio by weight can be applied when the hardening agent is a melamine type.

A hardening promoter can be added to a urethane polyol or a coating composition of the present invention. When hardening agent is a (block) polyisocyanate, a basic compound is mainly used. Typical examples thereof include, for example, amine compounds such as triethylamine and 1,4-diazabicyclooctane; and metal carboxylate salts such as dibutyltin dilaurate and zinc naphthenate.

When the hardening agent is a melamine type, an acidic compound is mainly used. Typical examples thereof include, for example, carboxylic acids such as acetic acid, lactic acid, succinic acid, oxalic acid, maleic acid and decanedicarboxylic acid; sulfonic acids such as p-toluenesulfonic acid, dodecylbenzenesulfonic acid and dinonylnaphthalenesulfonic acid; acidic phosphate esters such as dimethyl phosphate, diethyl phosphate, dibutyl phosphate, dioctyl phosphate, dilauryl phosphate, monoethyl phosphate, monoethyl phosphate, monobutyl phosphate, and monooctyl phosphate; and phosphites such as diethyl phosphite, dibutyl phosphite, dioctyl phosphite, dilauryl phosphite, monoethyl phosphite, monobutyl phosphite, monooctyl phosphite and monolauryl phosphite. These acidic compounds can be reacted with amine compounds. Said amine compounds include, for example, alkyl amines such as ethylamine, diethylamine, triethylamine, n-butylamine and di-n-butylamine; and alkanolamines such as ethanolamine, diethanolamine and triethanolamine.

The hardening promoter is added in an amount of 0.1 to 10% by weight, preferably 0.1 to 5% by weight, based on a weight of resin component of the coating to which the promoter is added.

Further, various solvents and additives can be used depending on an application and a purpose thereof. The solvent used can be suitably selected from a group consisting of ketones such as acetone, methyl ethyl ketone and methyl isobutyl ketone; esters such as ethyl acetate, n-butyl acetate and cellosolve acetate; alcohols such as butanol and isopropanol, depending on its purpose and application. These solvents can be used alone or in combination of two or more types.

In addition, antioxidants such as hindered phenol; UV absorbers such as benzotriazole and benzophenone; pigments such as titanium oxide, carbon black, indigo, quinacridone and pearl mica; metal powder pigments such as aluminum; and rheology regulating agents such as hydroxyethylcellulose and urea compounds can optionally be added.

The coating composition thus prepared is used as a primer, a top coating or an intermediate coating for materials such as metal including steel plate and surface treated steel plate, plastics and inorganic materials; and for precoated metal including corrosion resistant steel plate and automotive coating as an aqueous top clear coating, aqueous base coating and aqueous intermediate coating, by using roll coating, curtain flow coating, spray coating and electrostatic coating, to furnish beautiful appearance, weatherability, acid resistance, corrosion resistance and chipping resistance. Further, it is also useful as a urethane raw material for adhesives, pressure sensitive adhesives, elastomers, foams and surface modifiers.

In particular, an aqueous coating as primer for automobiles is required to have superior flexibility of coating film to furnish a high level of chipping resistance as an essential function thereof and a function to hide unevenness of automotive steel plate, as well as hardening property. The aqueous urethane polyol of the present invention is extremely effective for these requirements.

The present invention will be described in more detail hereinbelow based on Examples, but the present invention should not be construed to be limited by the following Examples. Unit represented by "parts" means "parts by weight" in all cases.

<<Measurement of Number Average Molecular Weight>>

Number average molecular weight is the molecular weight based on polystyrene measured by a gel permeation chromatography (hereinafter, GPC) using the following equipment:
Equipment: HLC-802A made by Toso Corp.
Column: G1000HXL×1
G2000HXL×1
G30000HXL×1, made by Toso Corp.
Carrier: Tetrahydrofuran
Detection method: Differential refractometer <<Concentration of Unreacted Diisocyanate Monomer>>

The concentration was determined by an area % of a peak corresponding to a molecular weight of unreacted diisocynate monomer (for example, 168 for HDI) obtained by the above GPC measurement.

<<Measurement of Viscosity>>

Viscosity was measured using E type viscometer (Model VISCONIC ED made by TOKIMEC INC.) at 25° C.

<<Isocyanate Group Concentration>>

The concentration was measured by adding excess di-n-butylamine to polyisocyanate dissolved in toluene. After further adding isopropanol, the mixture was titrated with an aqueous hydrochloric acid solution using bromocresol green as an indicator.

<<Average Number of Isocyanate Groups>>

The average number was calculated from a number average molecular weight and a concentration of isocyanate group according to the following equation.

(Number average molecular weight)×(Concentration of isocyanate group)/(42×100)

<<Ratio of (Urethane Group)/(Hydroxyl Group+Hydrophilic Group)>>

The ratio was determined by dissolving a sample in deuterated chloroform and measuring a concentration of urethane group based on diisocyanate by 1H-NMR using JNM-LA400 made by JEOL Ltd.

<<Hydroxyl Value>>

A solution of acetic anhydride in pyridine was added to a sample. The solution was kept at 115° C. for 1 hour, then cooled and added with water. The solution was maintained at 110° C. for 10 minutes then cooled. The solution was titrated with an ethanol solution of potassium hydroxide using phenolphthalein as an indicator to obtain a hydroxyl value.

<<Average Number of Hydroxyl Groups>>

The number was calculated from a number average molecular weight and a hydroxyl value according to the following equation.

(number average molecular weight)×(hydroxyl value)/(56.1×1000)

<<Acid Value>>

Acid value was measured by dissolving a sample in a toluene-ethyl alcohol solution (ratio by weight of 1:1), and titrating the solution with an ethanol solution of potassium hydroxide using phenolphthalein as an indicator.

<<Aptitude for Aqueous Coating>>

Aptitude for aqueous coating was evaluated by dropping a urethane polyol into water, and observing a dispersing state according to the following criteria:
○: Dispersed; and
X: Precipitated.

<<Evaluation of Impact Resistance>>

Impact resistance was evaluated using a DuPont type impact tester under the conditions of impactor diameter of 1.27 cm, load of 500 g and height of 50 cm, at a coating film temperature of 25° C., according to the following criteria:
X: Delamination or fracture was observed in a coating film;
○: Crack was observed in a coating film; and
⊚: a coating film was in order.

<<Gel Fraction>>

A hardened coating film was immersed in acetone at 20° C. for 24 hours, then a ratio of a weight of undissolved portion to a weight before immersion was calculated. Gel fraction was evaluated based on the ratio according to the following criteria:
X: Less than 80%;
○: Not less than 80% but less than 90%; and
⊚: Not less than 90%.

<<Hiding Power>>

An electrodeposited plate was coated with a sample so as to obtain a film thickness of 40 $\mu$m, followed by hardening at 140° C. for 30 minutes, and appearance of coating film was evaluated by a visual inspection. Hiding power was evaluated according to the following criteria:
○: Smooth coating film with no orange peel observed;
Δ: Coating film with minute orange peel observed; and
X: Coating film with orange peel observed.

PRODUCTION EXAMPLE 1

(Production of Polyisocyanate)

Into a four-necked flask equipped with a stirrer, a thermometer, a refluxing cooler and a nitrogen blowing tube, 600 parts of HDI and 49 parts of hexahydric polyether polyol (trade name "Adeka Polyether Polyol SP-600"; from Asahi Denka Kogyo Co., Ltd.), a number average molecular weight of 610) (an equivalent ratio of (isocyanate group)/(hydroxyl group) of 15/1) were charged under nitrogen atmosphere. The temperature of said reactor was maintained at 160° C. under stirring for 9 hours. After the temperature of reaction mixture was lowered, unreacted diisocyanate was removed using a thin film distillator. The polyisocyanate thus obtained had a number average molecular weight of 1,940, a concentration of isocyanate group of 16.9% by weight, a viscosity of 6,200 mPa·s/25° C., a concentration of HDI of 0.2% by weight and the average number of isocyanate groups of 7.8, was obtained.

PRODUCTION EXAMPLE 2

(Manufacturing of Polyisocyanate)

The similar procedure as in Production Example 1 was carried out except that polyol, reaction temperature and reaction time were those set forth in Table 1. The results are shown in Table 1.

PRODUCTION EXAMPLE 3

(Production of Polyisocyanate)

Into a four-necked flask equipped with an stirrer, a thermometer, a reflux cooling tube, a nitrogen blowing tube and a dropping funnel, 600 parts of HDI and 45 parts of polycaprolactone type polyester polyol "Placcel 303" (trade name, from Dicel Chem. Ind. Ltd., a number average molecular weight of 300) which is a trihydric alcohol, under nitrogen atmosphere. The temperature in said reactor was maintained at 90° C. under stirring for 1 hour to perform a urethanization reaction. Then isocyanuration catalyst, tetramethylammonium capriate, was added thereto, while the temperature in said reactor was maintained at 60° C., followed by terminating the reaction by adding phosphoric acid when the yield reached 47%. The reaction mixture was filtered, then unreacted HDI was removed using a thin layer evaporator can. The polyisocyanate thus-obtained had a viscosity at 25° C. of 21,000 mPa·s, a concentration of isocyanate group of 17.7% by weight, a concentration HDI of 0.2% by weight, a number average molecular weight of 1,560, and the average number of isocyanate groups of 6.6.

PRODUCTION EXAMPLE 4

(Production of Polyisocyanate)
Into a four-necked flask equipped with a stirrer, a thermometer, a reflux cooling tube, a nitrogen blowing tube and a dropping funnel, 600 parts of HDI was charged under nitrogen atmosphere. The temperature in said reactor was maintained at 60° C. under stirring. Then isocyanuration catalyst, tetramethylammonium capriate, was added, and the reaction was terminated by adding phosphoric acid when the yield reached 35%. The reaction mixture was filtered, then unreacted HDI was removed using a thin evaporator. The polyisocyanate thus obtained had a viscosity at 25° C. of 2,600 mPa s, a concentration of isocyanate group of 22.2% by weight, a concentration of HDI of 0.2% by weight, a number average molecular weight of 660 and the average number of isocyanate groups of 3.5, was obtained.

EXAMPLE 1

(Production of Aqueous Urethane Polyol)
Using the similar equipment as in Production Example 1, 50 parts of polyisocyanate obtained in Production Example 1 and 162 parts of methyl ethyl ketone were charged and mixed. The mixture was added with 60.5 parts of hydroxypivalic acid neutralized with triethylamine, then maintained at 70° C. for 1 hour. The mixture was further added with 465 parts of 1,3-butanediol, and maintained at 70° C. for further 1 hour. After that, it was confirmed that an absorption peak corresponding to an isocyanate group has disappeared by an IR spectrum measurement of the reaction mixture. An equivalent ratio of (hydroxyl group of hydroxypivalic acid+hydroxyl group of 1,3-butanediol)/(isocyanate group of polyisocyanate) used in this reaction was 2.7.

Methyl ethyl ketone was removed from this solution using a rotary evaporator under conditions of 70° C. and 50 mmHg. Further, pH of the mixture was adjusted to 8.0 by using dimethylethanolamine.

A concentration of the urethane polyol obtained was 70% by weight, and the urethane polyol itself had the average number of hydroxyl groups of 6.3, a hydroxyl value of 137, a ratio of (urethane group)/(hydroxyl group+hydrophilic group (carboxyl group derived from hydroxypivalic acid)) of 1.6 and a number average molecular weight of 2,800.

TABLE 1

(Production of polyisocyanate)

| | Charged Amount | | Reaction Conditions | | Characteristics of Polyisocyanate | | | | |
|---|---|---|---|---|---|---|---|---|---|
| Example | HDI (parts) | Polyol (parts) | Temp. (° C.) | Time (Hr) | Average Number of Isocyanate Groups | Conc. of Isocyanate Group (% by weight) | Viscosity (mPa · s/ 25° C.) | Number Average MW | Conc. of Unreacted Diisocyanate (% by weight) |
| Production Example 1 | 600 | SP600*¹ 49 | 160 | 9 | 7.8 | 16.9 | 6,200 | 1,940 | 0.2 |
| Production Example 2 | 600 | HP1030*² 147 | 160 | 3 | 10.1 | 11.2 | 86,000 | 3,770 | 0.2 |
| Production Example 3 | 600 | Placcel 303*³ 60 | 90 60 | 1 — | 6.6 | 17.7 | 21,000 | 1,560 | 0.2 |
| Production Example 4 | 600 | — | 60 | — | 3.5 | 22.2 | 2,600 | 660 | 0.2 |

*¹Trade name of a product made by Asahi Denka (6-hydric polyether polyol)
*²Trade name of a product made by Asahi Denka (5-hydric polyether polyol)
*³Trade name of a product made by Dicel (3-hydric polyester polyol)

PRODUCTION EXAMPLE 5

(Production of Aqueous Polyester Polyol)
Into a reactor, 348 parts of neopentyl glycol, 150 parts of trimethylolpropane, 128 parts of adipic acid and 435 parts of phthalic anhydride were charged. The mixture was maintained at 220° C. for 5 hours, added with 42 parts of trimellitic anhydride, and further maintained at 160° C. for 1 hour. The mixture was further added with 88 parts of ε-caprolactone and 1 part of dodecylbenzenesulfonic acid, and maintained at 150° C. for 3 hours. A polyester resin having a number average molecular weight of 4,800, an acid value of 25 mg KOH/g and a hydroxyl value of 110 mg KOH/g was obtained.

EXAMPLES 2 TO 4

(Production of Aqueous Urethane Polyols)
The similar procedures as in Example 1 were carried out except that the conditions as shown in Table 2 were employed, using the similar equipment as in Production Example 1 to produce aqueous urethane polyols. The results are shown in Table 2.

COMPARATIVE EXAMPLE 1

(Production of Urethane Polyol with No Hydrophilic Group)
The similar procedure as in Example 1 was carried out except that the conditions as shown in Table 2 were employed, using the similar equipment as in Production Example 1 to produce aqueous urethane polyols. The results are shown in Table 2.

COMPARATIVE EXAMPLE 2

(Production of Aqueous Urethane Polyol)

The similar procedure as in Example 1 was carried out except that the conditions as shown in Table 2 were employed, using the similar equipment as in Production Example 1 to produce aqueous urethane polyols. The results are shown in Table 2.

temperature for 30 minutes, these plates were baked in an oven at 140° C. for 30 minutes. The results of the evaluation on impact resistance of the steel plate with a coating film thus formed was ⊚, and hiding power of the electrodeposited plate with the coating film was ○. The result of evaluation on gel fraction of the coating film on the polypropylene plate was ○.

EXAMPLES 6 TO 8

The similar procedures as in Example 5 were carried out except that the conditions shown in Table 3 were employed. The results are shown in Table 3.

TABLE 2

Production of urethane polyols and their aptitudes for an aqueous coating

| | | | | | Characteristics of Urethane Polyol | | | | |
|---|---|---|---|---|---|---|---|---|---|
| Example | Polyisocyante (parts) | Hydroxypyvalic Acid*¹ (parts) | 1,3-Butan-diol (parts) | Ratio of Active Hydrogen*² | Number Average MW | OH Value (mgKOH/g) | Average Number of OH groups | (Urethane group)/ (OH group + Hydrophilic group)*³ | Aptitude for Aqueous coating |
| Example 1 | Production Example 1 500 | 60.5 | 465 | 2.7 | 2,800 | 137 | 6.3 | 1.6 | ○ |
| Example 2 | Production Example 2 500 | 60.5 | 172 | 2.6 | 4,950 | 90 | 8.1 | 1.0 | ○ |
| Example 3 | Production Example 3 500 | 60.5 | 489 | 2.7 | 2,470 | 140 | 6.2 | 1.0 | ○ |
| Example 4 | Production Example 4 500 | 60.5 | 640 | 2.8 | 1,025 | 172 | 3.1 | 1.0 | ○ |
| Comp. Example 1 | Production Example 4 500 | — | 715 | 3.0 | 970 | 201 | 3.5 | 1.0 | X |
| Comp. Example 2 | Production Example 4 500 | 143 | 530 | 2.5 | 1,080 | 134 | 2.6 | 1.0 | ○ |

*¹Equimolar neutralized product of hydroxypivalic acid and triethylamine
*²(OH group of hydroxypivalic acid + OH group of 1,3-butan-diol)/(isocyanate group) (molar ratio)
*³The hydrophilic group is a carboxyl group derived from hydroxypivalic acid.

EXAMPLE 5

(Coating Composition Using Aqueous Urethane Polyol)

A mixture of 29 parts of the urethane polyol of Example 1 (20 parts as a resin component), 70 parts of the polyester resin of Production Example 4 and 33 parts of a melamine type hardener "Cymel 327" (trade name, from Mitsui Cyanamide Co., Ltd.) was further added with 480 parts of ion exchanged water and dimethyletanolamine, to prepare an aqueous coating having pH of 8 and a solid content of 20% by weight. The coating obtained was applied to a steel plate, an electrodeposited plate and a polypropylene plate using an applicator. After being left for setting at room

COMPARATIVE EXAMPLES 3 TO 5

The similar procedures as in Example 6 were carried out except that the conditions shown in Table 3 were employed. The results are shown in Table 3.

Thus, an aqueous urethane polyol of the present invention can provide a good aqueous coating composition having flexibility, hiding power, hardening property and weatherability.

TABLE 3

Evaluation of aqueous coating compositions

| Example | Polyol (parts)*¹ | Hardening Agent (parts)*¹ | Urethane Polyol (parts)*¹ | Gel Fraction % | Impact Resistance | Hiding Power |
|---|---|---|---|---|---|---|
| Example 5 | Production Example 5 70 | Cymel 327 30 | Example 1 20 | ○ | ⊚ | ○ |

TABLE 3-continued

Evaluation of aqueous coating compositions

| Example | Polyol (parts)*1 | Hardening Agent (parts)*1 | Urethane Polyol (parts)*1 | Gel Fraction % | Impact Resistance | Hiding Power |
|---|---|---|---|---|---|---|
| Example 6 | Production Example 5 70 | Cymel 327 30 | Example 2 20 | ○ | ◎ | ○ |
| Example 7 | Production Example 5 70 | Cymel 327 30 | Example 3 20 | ○ | ◎ | ○ |
| Example 8 | Production Example 5 70 | Cymel 327 30 | Example 4 20 | ○ | ○ | ○ |
| Comp. Example 3 | Production Example 5 70 | Cymel 327 30 | — | ○ | X | Δ |
| Comp. Example 4 | Production Example 5 70 | Cymel 327 30 | Comp. Example 2 20 | Δ | X | X |
| Comp. Example 5 | Production Example 5 70 | Cymel 327 30 | PUD*2 20 | ○ | ◎ | X |

*1All parts in the compositions represent values of resin component not including solvent.
*2Polyurethane dispersion NeoRez R-960 from Avicia Ltd.

What is claimed is:

1. An aqueous urethane polyol, which satisfies all the following requirements:
   1) comprising a hydroxyl group, a urethane group and a hydrophilic group in a molecule;
   2) having an average number of hydroxyl groups of 3 to 20;
   3) having a hydroxyl value of 10 to 200 (mg KOH/g);
   4) having an equivalent ratio of (urethane group)/(hydroxyl group+hydrophilic group) of 1 to 2; and
   5) having a number average molecular weight of 1,000 to 20,000,
   wherein said aqueous urethane polyol is produced by reacting:
   (a) a polyisocyanate derived from at least an aliphatic and/or an alicyclic diisocyanate, having:
      an average number of isocyanate groups of 3 to 20;
      a concentration of isocyanate group of 3 to 25% by weight;
      a concentration of diisocyanate monomer of 3% by weight or less; and
      a number average molecular weight of 600 to 19,000;
   (b) a polyol; and
   (c) a compound comprising an active hydrogen group and a hydrophilic group in a single molecule; at an equivalent ratio of (hydroxyl group of (b)+active hydrogen group of (c))/(isocyanate group of (a))>1.

2. The aqueous urethane polyol in accordance with claim 1, wherein the number average molecular weight of the polyisocyanate is 900 to 19,000.

3. The aqueous urethane polyol in accordance with claim 1, wherein the number of isocyanate groups of the polyisocyanate is 6 to 20.

4. The aqueous urethane polyol in accordance with claim 1, wherein the polyisocyanate is derived from an aliphatic and/or an alicyclic diisocyanate and polyol.

5. An aqueous coating composition, comprising the aqueous urethane polyol in accordance with claim 1.

6. The aqueous coating composition in accordance with claim 5, which is for an aqueous coating as primer for automobiles.

7. A method for applying a primer to an automobile, comprising coating said automobile with the aqueous urethane polyol in accordance with claim 1.

8. The aqueous urethane polyol in accordance with claim 2, wherein the polyisocyanate is derived from an aliphatic and/or an alicyclic diisocyanate and polyol.

9. The aqueous urethane polyol in accordance with claim 3, wherein the polyisocyanate is derived from an aliphatic and/or an alicyclic diisocyanate and polyol.

10. An aqueous coating composition, comprising the aqueous urethane polyol in accordance with claim 3.

11. The aqueous coating composition in accordance with claim 10, which is for an aqueous coating as primer for automobiles.

12. A method for applying a primer to an automobile, comprising coating said automobile with the aqueous urethane polyol in accordance with claim 3.

13. A method for producing an aqueous urethane polyol,
   said aqueous urethane polyol comprising a hydroxyl group, a urethane group and a hydrophilic group in a molecule, wherein:
   an average number of hydroxyl groups is 3 to 20;
   a hydroxyl value is 10 to 200 (mg KOH/g);
   an equivalent ratio of (urethane group)/(hydroxyl group+hydrophilic group) is 1 to 2; and
   a number average molecular weight is 1,000 to 20,000, and
   said method comprising reacting:
   (a) a polyisocyanate derived from at least an aliphatic and/or an alicyclic diisocyanate, having:
      an average number of isocyanate groups of 3 to 20;
      a concentration of isocyanate group of 3 to 25% by weight;
      a concentration of diisocyanate monomer of 3% by weight or less; and
      a number average molecular weight of 600 to 19,000;

(b) a polyol; and
(c) a compound comprising an active hydrogen group and a hydrophilic group in a single molecule;

at an equivalent ratio of (hydroxyl group of (b)+active hydrogen group of (c))/(isocyanate group of (a))>1.

14. The production method in accordance with claim 13, wherein the number average molecular weight of the polyisocyanate is 900 to 19,000.

15. The production method in accordance with claim 13, wherein the average number of isocyanate groups of the polyisocyanate is 6 to 20.

16. The production method in accordance with claim 13, wherein the polyisocyanate is derived from an aliphatic and/or an alicyclic diisocyanate and polyol.

* * * * *